United States Patent
Hsu (10) Patent No.: US 12,425,080 B2
(45) Date of Patent: Sep. 23, 2025

(54) WIRELESS COMMUNICATION SYSTEM

(71) Applicant: ASUSTeK COMPUTER INC., Taipei (TW)

(72) Inventor: Chien-Ming Hsu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 74 days.

(21) Appl. No.: 18/502,028

(22) Filed: Nov. 5, 2023

(65) Prior Publication Data

US 2024/0356596 A1    Oct. 24, 2024

(30) Foreign Application Priority Data

Apr. 19, 2023    (TW) ................................ 112114647

(51) Int. Cl.
*H04B 7/06* (2006.01)
*H04B 1/00* (2006.01)

(52) U.S. Cl.
CPC ......... *H04B 7/0602* (2013.01); *H04B 1/0053* (2013.01)

(58) Field of Classification Search
CPC ........... H01Q 1/22; H01Q 1/24; H01Q 21/28; H01Q 5/328; H04B 1/00; H04B 1/40; H04B 1/48; H04B 1/0053; H04B 7/0602; H04B 17/309; H04W 88/02; H04W 88/06
USPC ................ 375/219, 260, 262, 267, 295, 316
See application file for complete search history.

(56) References Cited

U.S. PATENT DOCUMENTS

| | | | |
|---|---|---|---|
| 10,355,344 B1* | 7/2019 | Ruaro | H01Q 3/24 |
| 10,574,285 B2* | 2/2020 | Bai | H04B 1/44 |
| 11,437,710 B2 | 9/2022 | Liao et al. | |
| 2018/0331714 A1 | 11/2018 | See et al. | |
| 2019/0036217 A1* | 1/2019 | Presti | H01Q 5/50 |
| 2020/0152324 A1 | 5/2020 | Stein et al. | |
| 2021/0135712 A1 | 5/2021 | Hong et al. | |
| 2021/0250885 A1 | 8/2021 | Medles et al. | |

FOREIGN PATENT DOCUMENTS

| | | |
|---|---|---|
| CN | 114503446 A | 5/2022 |
| CN | 114628887 A | 6/2022 |
| CN | 115065403 A | 9/2022 |
| CN | 115734193 A | 3/2023 |
| TW | 202042442 A | 11/2020 |
| TW | 202141942 A | 11/2021 |
| TW | I761669 B | 4/2022 |
| TW | I770793 B | 7/2022 |

* cited by examiner

*Primary Examiner* — Shawkat M Ali
(74) *Attorney, Agent, or Firm* — McClure, Qualey & Rodack, LLP (57) ABSTRACT

A wireless communication system includes at least one first antenna, a wireless network module, a satellite communication module, and a switch module. In the wireless communication system, one end of the switch module is connected to the first antenna, the other end is connected to the wireless network module and the satellite communication module, and the switch module selectively switches electrical connection of the wireless network module or the satellite communication module to the first antenna. When there is a wireless radio frequency signal, the switch module selectively turns on the first antenna and the wireless network module. When there is no wireless radio frequency signal, the switch module selectively turns on the first antenna and the satellite communication module.

13 Claims, 5 Drawing Sheets

WIRELESS COMMUNICATION SYSTEM

CROSS-REFERENCE TO RELATED APPLICATION

This application claims the priority benefit of Taiwan Application Serial No. 112114647, filed on Apr. 19, 2023. The entirety of the above-mentioned patent application is hereby incorporated by reference herein and made a part of the specification.

BACKGROUND OF THE INVENTION

Field of the Invention

The disclosure relates to a wireless communication system that allows a satellite communication module and a wireless network module to share antenna design.

Description of the Related Art

With development of communication technologies, mobile electronic products need to use antennas when transmitting or receiving radio frequency signals, and the mobile electronic products need to support more and more types of wireless signals. In an embodiment, for a mobile phone, a wireless local area network (WLAN) includes a corresponding antenna, a wireless wide area network (WWAN) includes a corresponding antenna, and a global positioning system (GPS) also includes a corresponding antenna. In addition, with addition of more functions, more antennas are required, resulting in an increasingly severe environment for antenna design.

In another aspect, a reason why satellite communication is gradually booming is to increase coverage of network signals and overcome places where ground base station signals do not cover, including remote mountainous areas, the middle of the ocean, and other places. However, to use satellite communication, additional satellite antennas need to be used, which requires more antenna designs inside an electronic product. In addition to causing space inside the electronic product to become smaller and smaller, isolation between antennas is also necessarily considered, which is not conducive to signal transmission and receiving of the antennas.

BRIEF SUMMARY OF THE INVENTION

The disclosure provides a wireless communication system. The wireless communication system includes at least one first antenna, a wireless network module, a satellite communication module, and a switch module. In the wireless communication system, one end of the switch module is connected to the first antenna, the other end of the switch module is connected to the wireless network module and the satellite communication module, and the switch module selectively switches electrical connection of the wireless network module or the satellite communication module to the first antenna. When there is a wireless radio frequency signal, the switch module selectively turns on the first antenna and the wireless network module, so that the wireless network module transmits and receives the wireless radio frequency signal through the first antenna. When there is no wireless radio frequency signal, the switch module selectively turns on the first antenna and the satellite communication module, so that the satellite communication module transmits and receives a satellite signal through the first antenna.

The disclosure also provides a wireless communication system. The wireless communication system includes at least one first antenna, a first wireless network module, a satellite communication module, and a first switch module, at least one second antenna, a second wireless network module, and a second switch module. In the wireless communication system, one end of the first switch module is connected to the first antenna, the other end is connected to the first wireless network module and the satellite communication module, and the first switch module selectively switches electrical connection of the first wireless network module or the satellite communication module to the first antenna. One end of the second switch module is connected to the second antenna, the other end is connected to the second wireless network module and the satellite communication module, and the second switch module selectively switches electrical connection of the second wireless network module or the satellite communication module to the second antenna. When there is a wireless radio frequency signal, the first switch module selectively turns on the first antenna and the first wireless network module, and the second switch module selectively turns on the second antenna and the second wireless network module, so that the first wireless network module transmits and receives the wireless radio frequency signal through the first antenna, and the second wireless network module transmits and receives the wireless radio frequency signal through the second antenna. When there is no wireless radio frequency signal, the first switch module selectively turns on the first antenna and the satellite communication module, and the second switch module selectively turns on the second antenna and the satellite communication module, so that the satellite communication module transmits and receives a satellite signal through the first antenna and the second antenna.

In conclusion, a wireless communication system provided in the disclosure integrates and shares satellite antennas and wireless network antennas without increasing sizes of the antennas and space, and switches, on the premise of sharing the antennas, different communication systems (a wireless network module or a satellite communication module) according to a usage scenario, to increase coverage of network signals. Therefore, the wireless communication system in the disclosure effectively improves antenna performance and maintains good wireless communication quality on the premise of reducing antenna design space.

DETAILED DESCRIPTION OF THE EMBODIMENTS

Embodiments of the disclosure are described with reference to relevant drawings. In addition, some elements are omitted in the drawings in the embodiments, to clearly show technical features of the disclosure. In the drawings, same reference numbers refer to same or similar elements or circuits. It is necessarily to be understood that although terms such as "first" and "second" are used herein to describe various elements, components, regions or circuits, function, but these elements, components, regions, and/or functions should not be limited by the terms, which are only used to distinguish one element, component, region, or function from another element, component, region, or function.

In the disclosure, antennas used for a satellite communication module and existing antennas of a wireless network module in an electronic device are integrated, to reduce antenna design space in the electronic device, and switch different communication systems for different scenarios by using internal switch modules. Currently, an antenna transmit band used by the satellite communication module is an L-band (1610 to 1617.775 MHz), and an antenna receive band is an S-band (2483.5 to 2495 MHz). From the antenna bands, the satellite communication module shares antennas (operating frequency: 0.6 to 7.5 GHZ) of wireless network modules such as a wireless local area network (WLAN) module, a wireless wide area network (WWAN) module, and a global positioning system (GPS) module.

Figure 1:
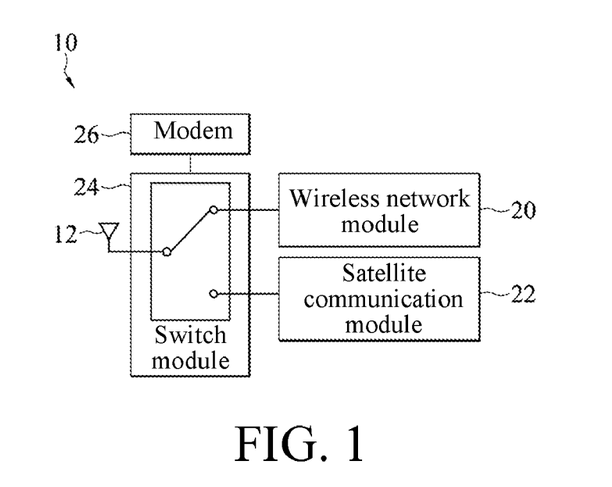
FIG. 1 is a schematic block diagram of a wireless communication system according to a first embodiment of the disclosure.
Figure 2:
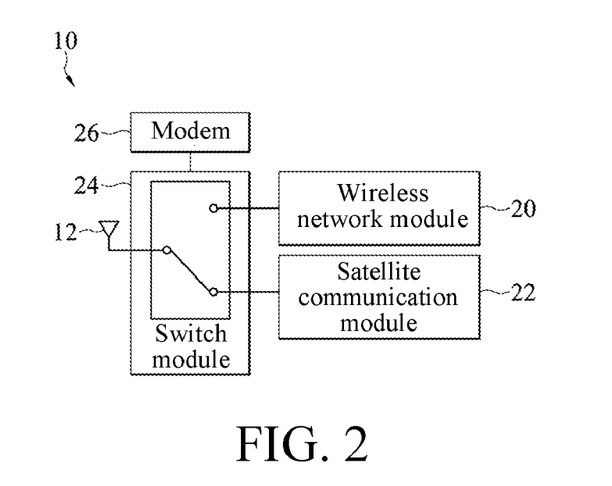
FIG. 2 is a schematic block diagram of a wireless communication system in a satellite communication state according to a first embodiment of the disclosure.

Refer to FIG. 1 and FIG. 2 together. A wireless communication system 10 is arranged in an electronic device (not shown in the figures). The wireless communication system 10 includes at least one first antenna 12, a wireless network module 20, a satellite communication module 22, and a switch module 24. In the wireless communication system 10, one end of the switch module 24 is connected to the first antenna 12, the other end is connected to the wireless network module 20 and the satellite communication module 22, and the switch module 24 selectively switches electrical connection of the wireless network module 20 or the satellite communication module 22 to the first antenna 12. As shown in FIG. 1, when there is a wireless radio frequency signal, such as a WLAN signal or a WWAN signal, the switch module 24 selectively turns on the first antenna 12 and the wireless network module 20, and the first antenna 12 supports the wireless network module 20, so that the wireless network module 20 transmits and receives the wireless radio frequency signal through the first antenna 12. In this case, there is a non-turned-on state between the satellite communication module 22 and the first antenna 12. Therefore, satellite communication is in an off state. As shown in FIG. 2, when there is no wireless radio frequency signal, the switch module 24 selectively turns on the first antenna 12 and the satellite communication module 22, to switch on satellite communication (Tx: 1.6 to 1.65 GHz, and Rx: 2.48 to 2.5 GHZ), and the first antenna 12 supports the satellite communication module 22, so that the satellite communication module 22 transmits and receives a satellite signal through the first antenna 12. In this case, there is a non-turned-on state between the wireless network module 20 and the first antenna 12. Based on this, the satellite communication module 22 and the wireless network module 20 share the first antenna 12.

In an embodiment, the electronic device is a mobile phone, a personal digital assistant, a tablet computer, a desktop computer, or the like. Any portable electronic device with a mobile communication function is covered in the disclosure.

In an embodiment, the wireless network module 20 is a WLAN module, a WWAN module, a GPS module, an ultra-wideband communication module, a millimeter wave communication module, or a WLAN and GPS communication module. In an embodiment, when the wireless network module 20 is a WLAN module, the first antenna 12 is a WLAN antenna that supports the WLAN module; when the wireless network module 20 is a WWAN module, the first antenna 12 is a WWAN antenna that supports the WWAN module; and so on.

In an embodiment, as shown in FIG. 1 and FIG. 2, the switch module 24 controls switching of a switch by using a software algorithm. The wireless communication system 10 of the disclosure further includes a modem 26, and the modem 26 is electrically connected to the switch module 24, so that the modem 26 generates a control signal to the switch module 24, to control action of the switch module 24. When there is a wireless radio frequency signal, the modem 26 controls the switch module 24 to select to switch to the wireless network module 20, to turn on the first antenna 12 and the wireless network module 20. When there is no wireless radio frequency signal, the modem 26 controls the switch module 24 to select to switch to the satellite communication module 22, to turn on the first antenna 12 and the satellite communication module 22.

Figure 3:
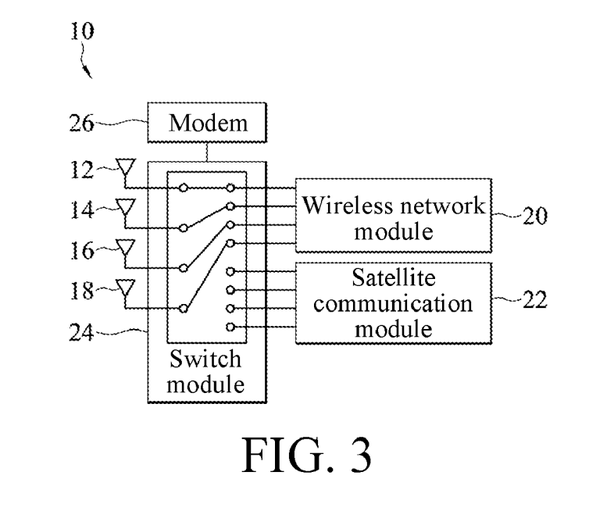
FIG. 3 is a schematic block diagram of a wireless communication system according to a second embodiment of the disclosure.
Figure 4:
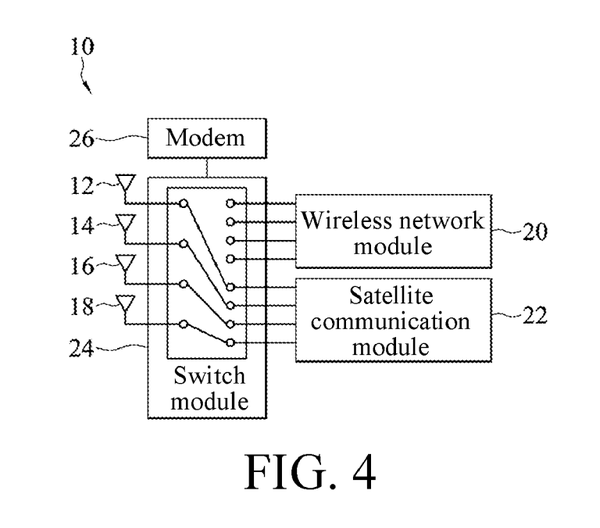
FIG. 4 is a schematic block diagram of a wireless communication system in a satellite communication state according to a second embodiment of the disclosure.

Refer to FIG. 3 and FIG. 4 together. A wireless communication system 10 includes a plurality of first antennas 12, 14, 16, and 18 (herein four first antennas are used as an embodiment), a wireless network module 20, a satellite communication module 22, a switch module 24, and a modem 26. In the wireless communication system 10, one end of the switch module 24 is connected to all the first antennas 12, 14, 16, and 18, the other end is connected to the wireless network module 20 and the satellite communication module 22, and the switch module 24 selectively switches electrical connection of the wireless network module 20 or the satellite communication module 22 to all the first antennas 12, 14, 16, and 18. The modem 26 is electrically connected to the switch module 24, to control action of the switch module 24. As shown in FIG. 3, when there is a wireless radio frequency signal, such as a WLAN signal or a WWAN signal, the modem 26 controls the switch module 24 to select to switch to the wireless network module 20, so that the switch module 24 turns on all the first antennas 12, 14, 16, and 18 and the wireless network module 20; and all the first antennas 12, 14, 16, and 18 support the wireless network module 20, so that the wireless network module 20 transmits and receives the wireless radio frequency signal through the first antennas 12, 14, 16, and 18. In this case, there is a non-turned-on state between the satellite communication module 22 and the first antennas 12, 14, 16, and 18. Therefore, satellite communication is in an off state. As shown in FIG. 4, when there is no wireless radio frequency signal, the modem 26 controls the switch module 24 to select to switch to the satellite communication module 22, so that the switch module 24 turns on the first antennas 12, 14, 16, and 18 and the satellite communication module 22, to switch on satellite communication; and all the first antennas 12, 14, 16, and 18 support the satellite communication module 22, so that the satellite communication module 22 transmits and receives a satellite signal through the first antennas 12, 14, 16, and 18. In this case, there is a non-turned-on state between the wireless network module 20 and the first antennas 12, 14, 16, and 18. When satellite communication is switched on, all the first antennas 12, 14, 16, and 18 support a receive band (Rx: 2.48 to 2.5 GHZ) of the satellite communication module 22, and use one or two of the first antennas 12, 14, 16, and 18 to support a transmit band (Tx: 1.6 to 1.65 GHZ) of the satellite communication module 22. Based on this, the satellite communication module 22 and the wireless network module 20 share all the first antennas 12, 14, 16, and 18. In addition, because there are the four first antennas 12, 14, 16, and 18, based on sharing the first antennas 12, 14, 16, and 18, the satellite communication module 22 supports multiple-input multiple-output (MIMO) transmission of 4*4, to strengthen a signal receive capability.

Figure 5:
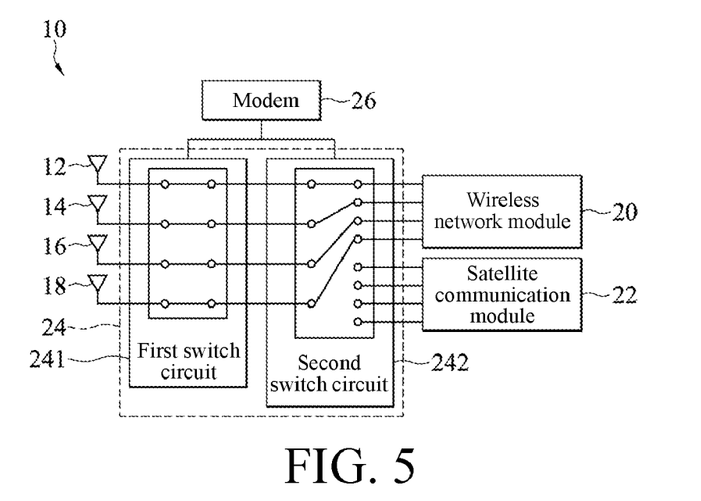
FIG. 5 is a schematic block diagram of a wireless communication system according to a third embodiment of the disclosure.
Figure 6:
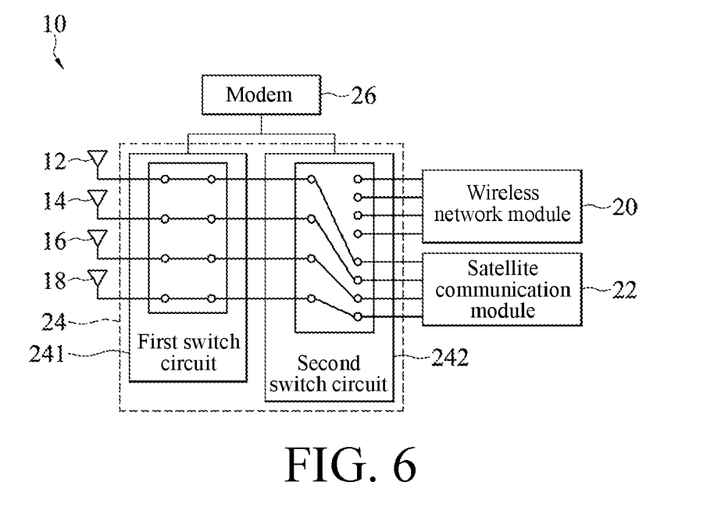
FIG. 6 is a schematic block diagram of a wireless communication system in a satellite communication state according to a third embodiment of the disclosure.

Refer to FIG. 5 and FIG. 6 together. A wireless communication system 10 includes a plurality of first antennas 12, 14, 16, and 18 (herein four first antennas are used as an embodiment), a wireless network module 20, a satellite communication module 22, a switch module 24, and a modem 26. In the wireless communication system 10, the switch module 24 further includes a first switch circuit 241 and a second switch circuit 242. One end of the first switch circuit 241 is connected to all the first antennas 12, 14, 16, and 18, the other end of the first switch circuit 241 is connected to one end of the second switch circuit 242, and the other end of the second switch circuit 242 is further connected to the wireless network module 20 and the satellite communication module 22, to selectively switch electrical connection of the wireless network module 20 or the satellite communication module 22 to all the first antennas 12, 14, 16, and 18 through the first switch circuit 241 and the second switch circuit 242. The modem 26 is electrically connected to the first switch circuit 241 and the second switch circuit 242 of the switch module 24 respectively, to respectively control action of the first switch circuit 241 and the second switch circuit 242. As shown in FIG. 5, when there is a wireless radio frequency signal, such as a WLAN signal or a WWAN signal, the modem 26 controls the second switch circuit 242 to select to switch to the wireless network module 20, so that the first switch circuit 241 and the second switch circuit 242 turn on the first antennas 12, 14, 16, and 18 and the wireless network module 20; and all the first antennas 12, 14, 16, and 18 support the wireless network module 20, so that the wireless network module 20 transmits and receives the wireless radio frequency signal through the first antennas 12, 14, 16, and 18. In this case, there is a non-turned-on state between the satellite communication module 22 and the first antennas 12, 14, 16, and 18. Therefore, satellite communication is in an off state. As shown in FIG. 6, when there is no wireless radio frequency signal, the modem 26 controls the second switch circuit 242 to select to switch to the satellite communication module 22, so that the first switch circuit 241 and the second switch circuit 242 selectively turn on the first antennas 12, 14, 16, and 18 and the satellite communication module 22, to switch on satellite communication; and all the first antennas 12, 14, 16, and 18 support the satellite communication module 22, so that the satellite communication module 22 transmits and receives a satellite signal through the first antennas 12, 14, 16, and 18. The first antennas 12, 14, 16, and 18 support a receive band of the satellite communication module 22, and use the first switch circuit 241 to selectively switch one or two of the first antennas 12, 14, 16, and 18 to support a transmit band of the satellite communication module 22. In this case, there is a non-turned-on state between the wireless network module 20 and the first antennas 12, 14, 16, and 18.

In an embodiment, as shown in FIG. 6, when there is no wireless radio frequency signal and satellite communication is switched on, all the first antennas 12, 14, 16, and 18 support the receive band (4Rx) of the satellite communication module 22, and use the first switch circuit 241 to selectively switch one of the first antennas 12, 14, 16, and 18 to support the transmit band (a single transmit antenna 1Tx) of the satellite communication module 22. In addition, when the first antenna 12, 14, 16, or 18 is selected to support the transmit band, which first antenna 12, 14, 16, or 18 is selected to be used as the transmit antenna according to quality of reported receive signals, to select one of the first antennas 12, 14, 16, and 18 that has best performance as the transmit antenna. In another embodiment, as shown in FIG. 6, when there is no wireless radio frequency signal and satellite communication is switched on, all the first antennas 12, 14, 16, and 18 support the receive band (4Rx) of the satellite communication module 22, and use the first switch circuit 241 to selectively switch two of the first antennas 12, 14, 16, and 18 to support the transmit band (two transmit antennas 2Tx) of the satellite communication module 22. In addition, when the first antennas 12, 14, 16, and 18 are selected to support the transmit band, which two first antennas 12, 14, 16, and 18 are selected to be used as the transmit antennas according to quality of reported receive signals, to select two of the first antennas 12, 14, 16, and 18 that have best performance as the transmit antennas. Based on this, the satellite communication module 22 and the wireless network module 20 share all the first antennas 12, 14, 16, and 18. Based on sharing the first antennas 12, 14, 16, and 18, the satellite communication module 22 supports the single transmit antenna (1Tx) and the two transmit antennas (2Tx), to strengthen a signal transmit capability.

Figure 7:
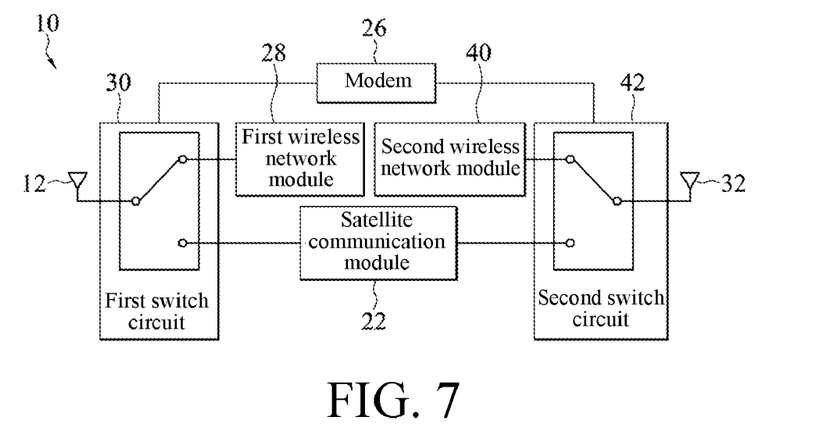
FIG. 7 is a schematic block diagram of a wireless communication system according to a fourth embodiment of the disclosure.
Figure 8:
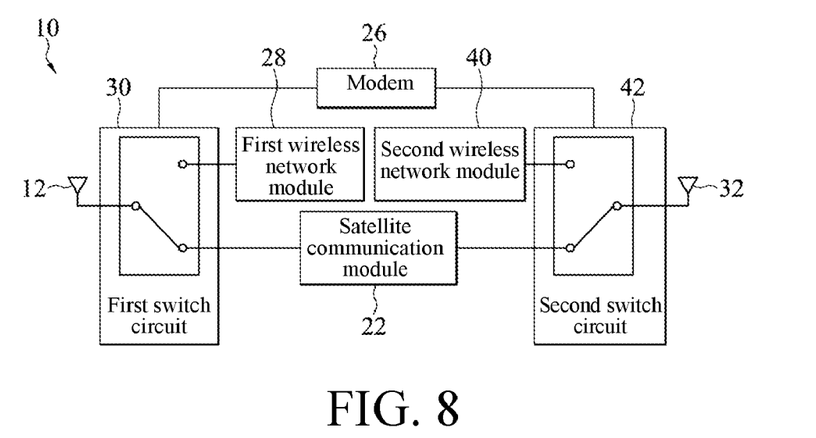
FIG. 8 is a schematic block diagram of a wireless communication system in a satellite communication state according to a fourth embodiment of the disclosure.

Refer to FIG. 7 and FIG. 8 together. A wireless communication system 10 is arranged in an electronic device. The wireless communication system 10 includes at least one first antenna 12, a first wireless network module 28, a satellite communication module 22, and a first switch module 30, at least one second antenna 32, a second wireless network module 40, and a second switch module 42. In the wireless communication system 10, one end of the first switch module 30 is connected to the first antenna 12, the other end is connected to the first wireless network module 28 and the satellite communication module 22, and the first switch module 30 selectively switches electrical connection of the first wireless network module 28 or the satellite communication module 22 to the first antenna 12. One end of the second switch module 42 is connected to the second antenna 32, the other end is connected to the second wireless network module 40 and the satellite communication module 22, and the second switch module 42 selectively switches electrical connection of the second wireless network module 40 or the satellite communication module 22 to the second antenna 32. As shown in FIG. 7, when there is a wireless radio frequency signal, such as a WLAN signal or a WWAN signal, the first switch module 30 selectively turns on the first antenna 12 and the first wireless network module 28, the second switch module 42 selectively turns on the second antenna 32 and the second wireless network module 40, the first antenna 12 supports the first wireless network module 28, and the second antenna 32 supports the second wireless network module 40, so that the first wireless network module 28 transmits and receives the wireless radio frequency signal through the first antenna 12, and the second wireless network module 40 transmits and receives the wireless radio frequency signal through the second antenna 32. In this case, there is a non-turned-on state between the satellite communication module 22 and the first antenna 12 or the second antenna 32. Therefore, satellite communication is in an off state. As shown in FIG. 8, when there is no wireless radio frequency signal, the first switch module 30 selectively turns on the first antenna 12 and the satellite communication module 22, and the second switch module 42 selectively turns on the second antenna 32 and the satellite communication module 22, to switch on satellite communication; and both the first antenna 12 and the second antenna 32 support the satellite communication module 22, so that the satellite communication module 22 transmits and receives a satellite signal through the first antenna 12 and the second antenna 32. In this case, there is a non-turned-on state between the first wireless network module 28 and the first antenna 12, and between the second wireless network module 40 and the second antenna 32.

In an embodiment, the first wireless network module 28 is a WLAN module, a WWAN module, a GPS module, an ultra-wideband communication module, a millimeter wave communication module, or a WLAN and GPS communication module; the second wireless network module 40 a WLAN module, a WWAN module, a GPS module, an ultra-wideband communication module, a millimeter wave communication module, or a WLAN and GPS communication module; and the first wireless network module 28 is different from the second wireless network module 40. In an embodiment, when the first wireless network module 28 is a WLAN module and the second wireless network module 40 is a WWAN module, the first antenna 12 is a WLAN antenna that supports the WLAN module, and the second antenna 32 is a WWAN antenna that supports the WWAN module; and so on.

In an embodiment, as shown in FIG. 8, when there is no wireless radio frequency signal and satellite communication is switched on, the satellite communication module 22 and the first wireless network module 28 (in an embodiment, the WLAN module) share the first antenna 12, so that the first antenna 12 supports a receive band (Rx: 2.48 to 2.5 GHZ) of the satellite communication module 22; and the satellite communication module 22 and the second wireless network module 40 (in an embodiment, the WWAN module) share the second antenna 32, so that the second antenna 32 supports a transmit band (Tx: 1.6 to 1.65 GHz) of the satellite communication module 22; and In another embodiment, as shown in FIG. 8, when there is no wireless radio frequency signal and satellite communication is switched on, the satellite communication module 22 and the first wireless network module 28 (in an embodiment, the WWAN module) share the first antenna 12, so that the first antenna 12 supports a receive band (Rx: 2.48 to 2.5 GHZ) of the satellite communication module 22; and the satellite communication module 22 and the second wireless network module 40 (in an embodiment, a WLAN and GPS communication module) share the second antenna 32, so that the second antenna 32 supports the transmit band (Tx: 1.6 to 1.65 GHz) and the receive band (Rx: 2.48 to 2.5 GHZ) of the satellite communication module 22.

In an embodiment, as shown in FIG. 7 and FIG. 8, the wireless communication system 10 of the disclosure further includes a modem 26, and the modem 26 is electrically connected to the first switch module 30 and the second switch module 42. The modem 26 generates a control signal to the first switch module 30 and the second switch module 42 respectively, to respectively control action of the first switch module 30 and the second switch module 42. When there is a wireless radio frequency signal, the modem 26 controls the first switch module 30 to select to switch the first wireless network module 28, to turn on the first antenna 12 and the first wireless network module 28; and the modem 26 also controls the second switch module 42 to select to switch the second wireless network module 40, to turn on the second antenna 32 and the second wireless network module 40. When there is no wireless radio frequency signal, the modem 26 controls the first switch module 30 and the second switch module 42 to select to switch to the satellite communication module 22, to turn on the first antenna 12 and the satellite communication module 22, and the second antenna 32 and the satellite communication module 22, and switch on satellite communication.

Figure 9:
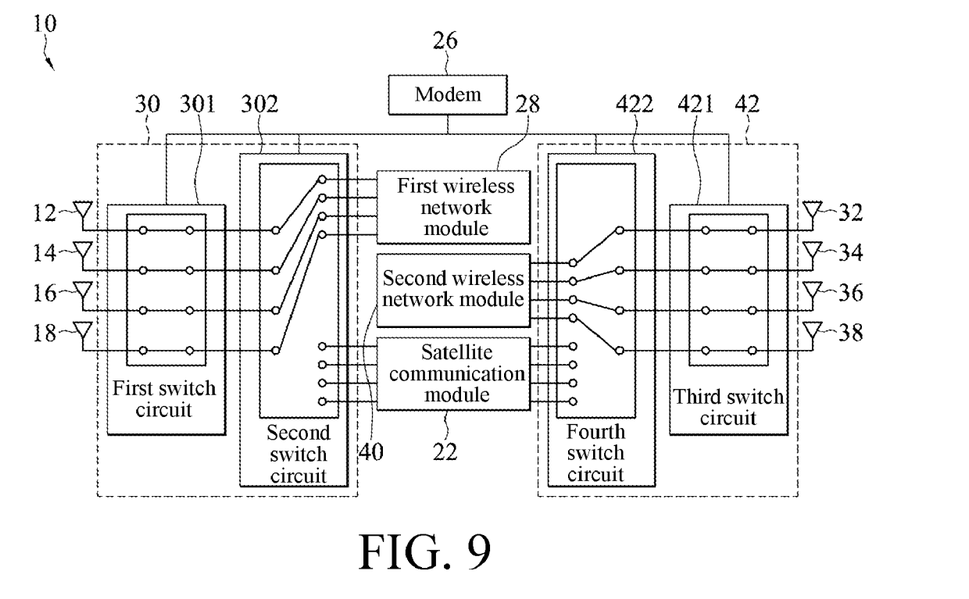
FIG. 9 is a schematic block diagram of a wireless communication system according to a fifth embodiment of the disclosure.
Figure 10:
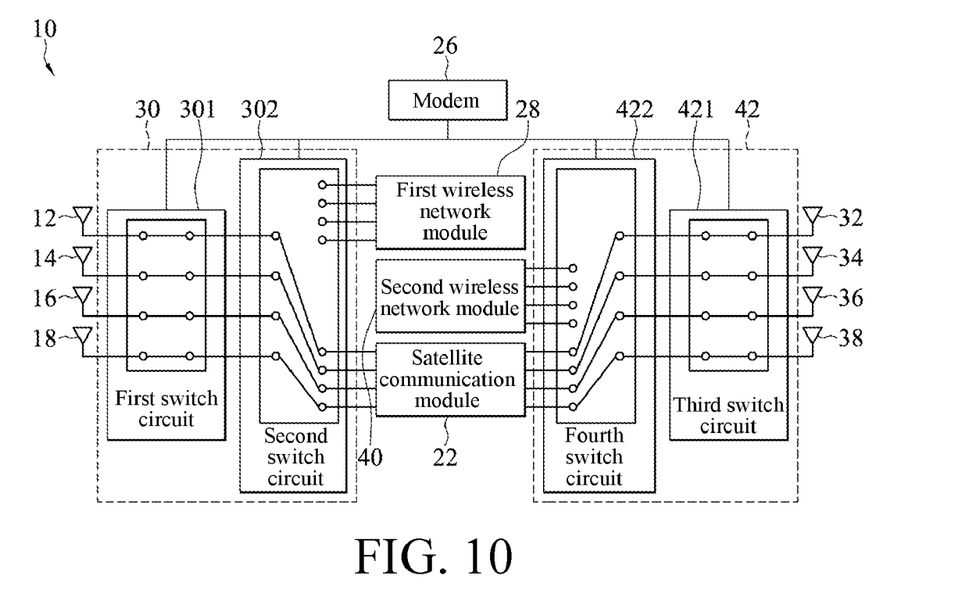
FIG. 10 is a schematic block diagram of a wireless communication system in a satellite communication state according to a fifth embodiment of the disclosure.

Refer to FIG. 9 and FIG. 10 together. A wireless communication system 10 includes a plurality of first antennas 12, 14, 16, and 18 (herein four first antennas are used as an embodiment), a first wireless network module 28, a satellite communication module 22, a first switch module 30, a plurality of second antennas 32, 34, 36, and 38 (herein four second antennas are used as an embodiment), a second wireless network module 40, a second switch module 42, and a modem 26. In the wireless communication system 10, one end of the first switch module 30 is connected to all the first antennas 12, 14, 16, and 18, the other end is connected to the first wireless network module 28 and the satellite communication module 22, and the first switch module 30 selectively switches electrical connection of the first wireless network module 28 or the satellite communication module 22 to the first antennas 12, 14, 16, and 18. One end of the second switch module 42 is connected to all the second antennas 32, 34, 36, and 38, the other end is connected to the second wireless network module 40 and the satellite communication module 22, and the second switch module 42 selectively switches electrical connection of the second wireless network module 40 or the satellite communication module 22 to the second antennas 32, 34, 36, and 38. The modem 26 is electrically connected to the first switch module 30 and the second switch module 42 respectively.

The first switch module 30 further includes a first switch circuit 301 and a second switch circuit 302. One end of the first switch circuit 301 is connected to all the first antennas 12, 14, 16, and 18, the other end of the first switch circuit 301 is connected to one end of the second switch circuit 302, and the other end of the second switch circuit 302 is further connected to the first wireless network module 28 and the satellite communication module 22, to selectively switch electrical connection of the first wireless network module 28 or the satellite communication module 22 to the first antennas 12, 14, 16, and 18 through the first switch circuit 301 and the second switch circuit 302. The second switch module 42 further includes a third switch circuit 421 and a fourth switch circuit 422. One end of the third switch circuit 421 is connected to all the second antennas 32, 34, 36, and 38, the other end of the third switch circuit 421 is connected to one end of the fourth switch circuit 422, and the other end of the fourth switch circuit 422 is further connected to the second wireless network module 40 and the satellite communication module 22, to selectively switch electrical connection of the second wireless network module 40 or the satellite communication module 22 to the second antennas 32, 34, 36, and 38 through the third switch circuit 421 and the fourth switch circuit 422. The modem 26 is electrically connected to the first switch circuit 301 and the second switch circuit 302 of the first switch module 30, and the third switch circuit 421 and the fourth switch circuit 422 of the second switch module 42 respectively, to respectively control action of the first switch circuit 301, the second switch circuit 302, the third switch circuit 421, and the fourth switch circuit 422.

As shown in FIG. 9, when there is a wireless radio frequency signal, such as a WLAN signal or a WWAN signal, the modem 26 controls the second switch circuit 302 to select to switch to the first wireless network module 28, so that the first switch circuit 301 and the second switch circuit 302 turn on the first antennas 12, 14, 16, and 18 and the first wireless network module 28; and all the first antennas 12, 14, 16, and 18 support the first wireless network module 28, so that the first wireless network module 28 transmits and receives the wireless radio frequency signal through the first antennas 12, 14, 16, and 18. In this case, there is a non-turned-on state between the satellite communication module 22 and the first antennas 12, 14, 16, and 18. In addition, the modem 26 controls the fourth switch circuit 422 to select to switch to the second wireless network module 40, so that the third switch circuit 421 and the fourth switch circuit 422 turn on the second antennas 32, 34, 36, and 38 and the second wireless network module 40; and all the second antennas 32, 34, 36, and 38 support the second wireless network module 40, so that the second wireless network module 40 transmits and receives the wireless radio frequency signal through the second antennas 32, 34, 36, and 38. In this case, there is a non-turned-on state between the satellite communication module 22 and the second antennas 32, 34, 36, and 38. Therefore, satellite communication is in an off state. As shown in FIG. 10, when there is no wireless radio frequency signal, the modem 26 controls the second switch circuit 302 to select to switch to the satellite communication module 22, so that the first switch circuit 301 and the second switch circuit 302 turn on the first antennas 12, 14, 16, and 18 and the satellite communication module 22, to switch on satellite communication, and all the first antennas 12, 14, 16, and 18 support the satellite communication module 22; and the modem 26 controls the fourth switch circuit 422 to select to switch to the satellite communication module 22, so that the third switch circuit 421 and the fourth switch circuit 422 turn on the second antennas 32, 34, 36, and 38 and the satellite communication module 22, to switch on satellite communication, and all the second antennas 32, 34, 36, and 38 support the satellite communication module 22, so that the satellite communication module 22 transmits and receives a satellite signal through the first antennas 12, 14, 16, and 18 and the second antennas 32, 34, 36, and 38.

In an embodiment, as shown in FIG. 10, when the first switch circuit 301 and the second switch circuit 302 select to turn on the first antennas 12, 14, 16, and 18 and the satellite communication module 22, the first antennas 12, 14, 16, and 18 support a receive band (Rx: 2.48 to 2.5 GHZ) of the satellite communication module 22, and use the first switch circuit 301 to selectively switch one or two of the first antennas 12, 14, 16, and 18 to support a transmit band (Tx: 1.6 to 1.65 GHZ) of the satellite communication module 22.

When the third switch circuit 421 and the fourth switch circuit 422 selectively turn on the second antennas 32, 34, 36, and 38 and the satellite communication module 22, the second antennas 32, 34, 36, and 38 support the receive band of the satellite communication module 22, and use the third switch circuit 421 to selectively switch one or two of the second antennas 32, 34, 36, and 38 to support the transmit band of the satellite communication module 22. Based on this, the satellite communication module 22 and the first wireless network module 28 share all the first antennas 12, 14, 16, and 18, and the satellite communication module 22 and the second wireless network module 40 share all the second antennas 32, 34, 36, and 38. Because there are the four first antennas 12, 14, 16, and 18 and the four second antennas 32, 34, 36, and 38 in total, based on sharing the first antennas 12, 14, 16, and 18 and the second antennas 32, 34, 36, and 38, the satellite communication module 22 supports MIMO transmission of 8*8, to strengthen a signal receive capability.

In an embodiment, as shown in FIG. 1, FIG. 3, FIG. 5, FIG. 7, and FIG. 9, the switch module 24, the first switch module 30, and the second switch module 42 are switches using x pole x throw (xPxT) or any combination of xPxT switches, and are mechanical electronic switches or semiconductor switches.

In conclusion, a wireless communication system provided in the disclosure integrates and shares satellite antennas and wireless network antennas without increasing sizes of the antennas and space, and switches, on the premise of sharing the antennas, different communication systems (a wireless network module or a satellite communication module) according to a usage scenario, to increase coverage of network signals. Therefore, the wireless communication system in the disclosure effectively improves antenna performance and maintains good wireless communication quality on the premise of reducing antenna design space. Furthermore, to enhance signal transmit and receive capabilities on an electronic device side, based on antenna sharing in the disclosure, the disclosure allows an electronic device with a wireless communication system to support 4*4 MIMO and 8*8 MIMO of a receive band, and switching of a single transmit antenna and functions of two transmit antennas of a transmit band.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. A wireless communication system, arranged in an electronic device, the wireless communication system comprising:
   at least one first antenna;
   a wireless network module;
   a satellite communication module; and
   a switch module, wherein one end of the switch module is connected to the first antenna, the other end is connected to the wireless network module and the satellite communication module, and the switch module selectively switches electrical connection of the wireless network module or the satellite communication module to the first antenna, wherein when there is a wireless radio frequency signal, the switch module selectively turns on the first antenna and the wireless network module, so that the wireless network module transmits and receives the wireless radio frequency signal through the first antenna; and when there is no wireless radio frequency signal, the switch module selectively turns on the first antenna and the satellite communication module, so that the satellite communication module transmits and receives a satellite signal through the first antenna.

2. The wireless communication system according to claim 1, wherein the wireless network module is a wireless local area network (WLAN) module, a wireless wide area network (WWAN) module, a global positioning system (GPS) module, an ultra-wideband communication module, a millimeter wave communication module, or a WLAN and GPS communication module.

3. The wireless communication system according to claim 1, wherein the at least one first antenna comprises a plurality of first antennas, and the first antennas are connected to the switch module, to use the switch module to selectively switch the electrical connection of the wireless network module or the satellite communication module to the first antennas.

4. The wireless communication system according to claim 3, wherein the switch module further comprises a first switch circuit and a second switch circuit, one end of the first switch circuit is connected to the first antennas, the other end is connected to the second switch circuit, and the second switch circuit is further connected to the wireless network module and the satellite communication module, to selectively switch the electrical connection of the wireless network module or the satellite communication module to the first antennas through the first switch circuit and the second switch circuit; and when the first switch circuit and the second switch circuit selectively turn on the first antennas and the satellite communication module, the first antennas support a receive band of the satellite communication module, and use the first switch circuit to selectively switch one or two of the first antennas to support a transmit band of the satellite communication module.

5. The wireless communication system according to claim 4, wherein the wireless network module is a wireless local area network (WLAN) module, a wireless wide area network (WWAN) module, a global positioning system (GPS) module, an ultra-wideband communication module, a millimeter wave communication module, or a WLAN and GPS communication module.

6. The wireless communication system according to claim 1, wherein the wireless communication system further comprises a modem, and the modem is electrically connected to the switch module, to generate a control signal to control action of the switch module.

7. A wireless communication system, arranged in an electronic device, the wireless communication system comprising:
at least one first antenna;
a first wireless network module;
a satellite communication module;
a first switch module, wherein one end of the first switch module is connected to the first antenna, the other end is connected to the first wireless network module and the satellite communication module, and the first switch module selectively switches electrical connection of the first wireless network module or the satellite communication module to the first antenna;
at least one second antenna;
a second wireless network module; and
a second switch module, wherein one end of the second switch module is connected to the second antenna, the other end is connected to the second wireless network module and the satellite communication module, and the second switch module selectively switches electrical connection of the second wireless network module or the satellite communication module to the second antenna, wherein
when there is a wireless radio frequency signal, the first switch module selectively turns on the first antenna and the first wireless network module, and the second switch module selectively turns on the second antenna and the second wireless network module, so that the first wireless network module transmits and receives the wireless radio frequency signal through the first antenna, and the second wireless network module transmits and receives the wireless radio frequency signal through the second antenna; and when there is no wireless radio frequency signal, the first switch module selectively turns on the first antenna and the satellite communication module, and the second switch module selectively turns on the second antenna and the satellite communication module, so that the satellite communication module transmits and receives a satellite signal through the first antenna and the second antenna.

8. The wireless communication system according to claim 7, wherein the first wireless network module and the second wireless network module are a wireless local area network (WLAN) module, a wireless wide area network (WWAN) module, a global positioning system (GPS) module, an ultra-wideband communication module, a millimeter wave communication module, or a WLAN and GPS communication module, and the first wireless network module is different from the second wireless network module.

9. The wireless communication system according to claim 7, wherein the at least one first antenna comprises a plurality of first antennas, and the first antennas are connected to the first switch module, to use the first switch module to selectively switch the electrical connection of the first wireless network module or the satellite communication module to the first antennas; and the at least one second antenna comprises a plurality of second antennas, and the second antennas are connected to the second switch module, to use the second switch module to selectively switch the electrical connection of the second wireless network module or the satellite communication module to the second antennas.

10. The wireless communication system according to claim 9, wherein the first switch module further comprises a first switch circuit and a second switch circuit, one end of the first switch circuit is connected to the first antennas, the other end is connected to the second switch circuit, and the second switch circuit is further connected to the first wireless network module and the satellite communication module, to selectively switch the electrical connection of the first wireless network module or the satellite communication module to the first antennas through the first switch circuit and the second switch circuit; and when the first switch circuit and the second switch circuit selectively turn on the first antennas and the satellite communication module, the first antennas support a receive band of the satellite communication module, and use the first switch circuit to selectively switch one or two of the first antennas to support a transmit band of the satellite communication module.

11. The wireless communication system according to claim 10, wherein the second switch module further comprises a third switch circuit and a fourth switch circuit, one end of the third switch circuit is connected to the second antennas, the other end is connected to the fourth switch circuit, and the fourth switch circuit is further connected to the second wireless network module and the satellite communication module, to selectively switch the electrical connection of the second wireless network module or the satellite communication module to the second antennas through the third switch circuit and the fourth switch circuit; and when the third switch circuit and the fourth switch circuit selectively turn on the second antennas and the satellite communication module, the second antennas support the receive band of the satellite communication module, and use the third switch circuit to selectively switch one or two of the second antennas to support the transmit band of the satellite communication module.

12. The wireless communication system according to claim 9, wherein the first wireless network module and the second wireless network module each are a wireless local area network (WLAN) module, a wireless wide area network (WWAN) module, a global positioning system (GPS) module, an ultra-wideband communication module, a millimeter wave communication module, or a WLAN and GPS communication module, and the first wireless network module is different from the second wireless network module.

13. The wireless communication system according to claim 7, wherein the wireless communication system further comprises a modem, and the modem is electrically connected to the first switch module and the second switch module, to generate a control signal to control action of the first switch module and the second switch module.

\* \* \* \* \*